Patented Sept. 28, 1926.

1,601,208

UNITED STATES PATENT OFFICE.

ARTHUR B. GERBER, OF ANNISTON, ALABAMA, ASSIGNOR TO FEDERAL PHOSPHORUS COMPANY, OF BIRMINGHAM, ALABAMA, A CORPORATION OF ALABAMA.

PROCESS OF PURIFYING PHOSPHORIC ACID.

No Drawing.   Application filed February 3, 1921. Serial No. 442,247.

My invention relates to a process for the treatment of crude concentrated phosphoric acid with sulphuric acid to precipitate lead contained as an impurity therein, and has for its object the purification of an acid at greater concentrations and in a manner different from methods than have heretofore been practiced.

Heretofore the general practice has been to produce phosphoric acid by treating phosphates, such as bone char, or phosphate rock with acids, usually sulphuric acid. In such processes the resultant phosphoric acid was usually a dilute solution, not over 25% phosphoric anhydride. This treatment and consequent production of phosphoric acid is usually carried out in lead lined tanks or reacting vats, and there is always present a small amount of free sulphuric acid with other dissolved impurities, such as arsenic, lead and lime compounds. This free sulphuric acid prevents the phosphoric acid from dissolving the lead of the containers and in this way makes the use of lead possible for the production of acid used for foods. Acid produced in this manner is ordinarily treated with hydrogen sulphide to remove the arsenic and lead as sulphide. This step in the purification is possible because sulphides formed are practically insoluble in a dilute phosphoric acid solution.

In the process for the production of phosphoric acid as outlined in the application for Letters Patent, Serial No. 365,065, filed March 11th, 1920, it was disclosed that a strong acid could be produced direct. Such acid is now being commercially produced in accordance with the disclosure herein set forth; and it is the object of the process hereindescribed and particularly pointed out in the claims, to form a step in the purification of a strong acid.

The acid as produced by condensation or electrical precipitation is of a concentration of from 55% to 95% phosphoric acid which is much stronger than any acid produced heretofore, and I have found such a strong acid requires purifying methods differing from those applied in the treatment of dilute acids made by the treatment of phosphate rock with sulphuric acid.

At first I attempted to remove the lead which was present, by treating the strong phosphoric acid with hydrogen sulphide under varying conditions of temperature and pressure. All these attempts at removing lead from the acid as lead sulphide were unsuccessful. After a series of unsuccessful efforts to eliminate lead by other means, experiments were made to remove the lead as lead sulphate. Sulphuric acid was selected as the compound carrying the sulphate to combine with the lead. However, it is obvious that other water soluble sulphates might be substituted if the contamination of the accompanying sulphate base is not objectionable in the resultant purified acid. The lead present in the phosphoric acid is first determined and sulphuric acid added in such calculated quantities as will combine with the lead and form lead sulphate, with a very small excess of sulphuric acid to keep the phosphoric acid from dissolving the lead sulphate as formed. I am aware that it is well known that lead sulphate is relatively insoluble in strong sulphuric acid, but I am not aware that the solubility of lead sulphate in strong phosphoric acid was known, and it was not until after I had conducted a series of tests that I was able to successfully reduce the lead content of strong phosphoric acid by precipitation as lead sulphate. The sulphuric acid is preferably added during the time in which the acid from the collection equipment is being pumped into the storage tanks. In this way a thorough mixture is procured. The precipitated sulphates settle to the bottom of the tank, and any remaining in suspension is removed in subsequent filtering operations. Thus no additional steps are necessary in this treatment and no extra equipment needed.

In order that this process may be more clearly understood, I will now give a typical example of the practice of this process; but it is pointed out that these proportions of sulphuric acid will vary widely depending on the lead present in the phosphoric acid.

To each 200 lbs. of strong phosphoric acid, with five hundredths per cent lead present, I add one pound of sulphuric acid 60° Baumé and thoroughly mix. The solution is then allowed to stand, and the lead precipitates as lead sulphate. By this means the lead contained in the phosphoric acid is reduced to .002 per cent or less, and there remains in the phosphoric acid about 0.3% or less free sulphuric acid. In a similar manner the lime may be very materially reduced in strong phosphoric acid by the use of sulphuric acid. For example, to 100 lbs. of 57% phosphoric acid was added 1% sulphuric acid, and the lime contained in the phosphoric acid was reduced from .5% to .18% with about .25% free sulphuric acid remaining. If such a treatment for the removal of lime be carried on in an acid containing 85% phosphoric acid, the lime may be reduced to .05% by the same addition of sulphuric acid.

It is obvious that those skilled in the art may vary the details of my process without departing from the spirit thereof and therefore, I do not wish to be limited to the above disclosure except as my be required by the claims.

Having thus described my invention, what I claim as new and desire to secure by Letters Patent, is:—

1. The process for the removal of lead and other impurities in soluble form in strong phosphoric acid, which consists in adding to the acid a reagent in quantity sufficient both to combine with the impurities and form sulphates, and to leave an excess of the reagent which will prevent the strong phosphoric acid from dissolving the lead sulphate as formed.

2. The process for the treatment of strong phosphoric acid containing forty per cent or more of phosphoric anhydride, which consists in adding sufficient sulphuric acid to precipitate the impurities in the phosphoric acid as sulphates, and to leave an excess of sulphuric acid sufficient to prevent the strong phosphoric acid from dissolving the sulphates as formed.

3. The process for the purification of strong phosphoric acid, which consists in adding to the acid a reagent in quantities sufficient to combine with the lead and other impurities in solution therein and form sulphates, and to provide an excess of said reagent which will prevent the precipitated sulphates dissolving in the strong purified phosphoric acid.

In testimony whereof I affix my signature.

ARTHUR B. GERBER.